Latcher & Powell,
Car Brake.
No. 2747. Reissued Aug. 20, 1867.
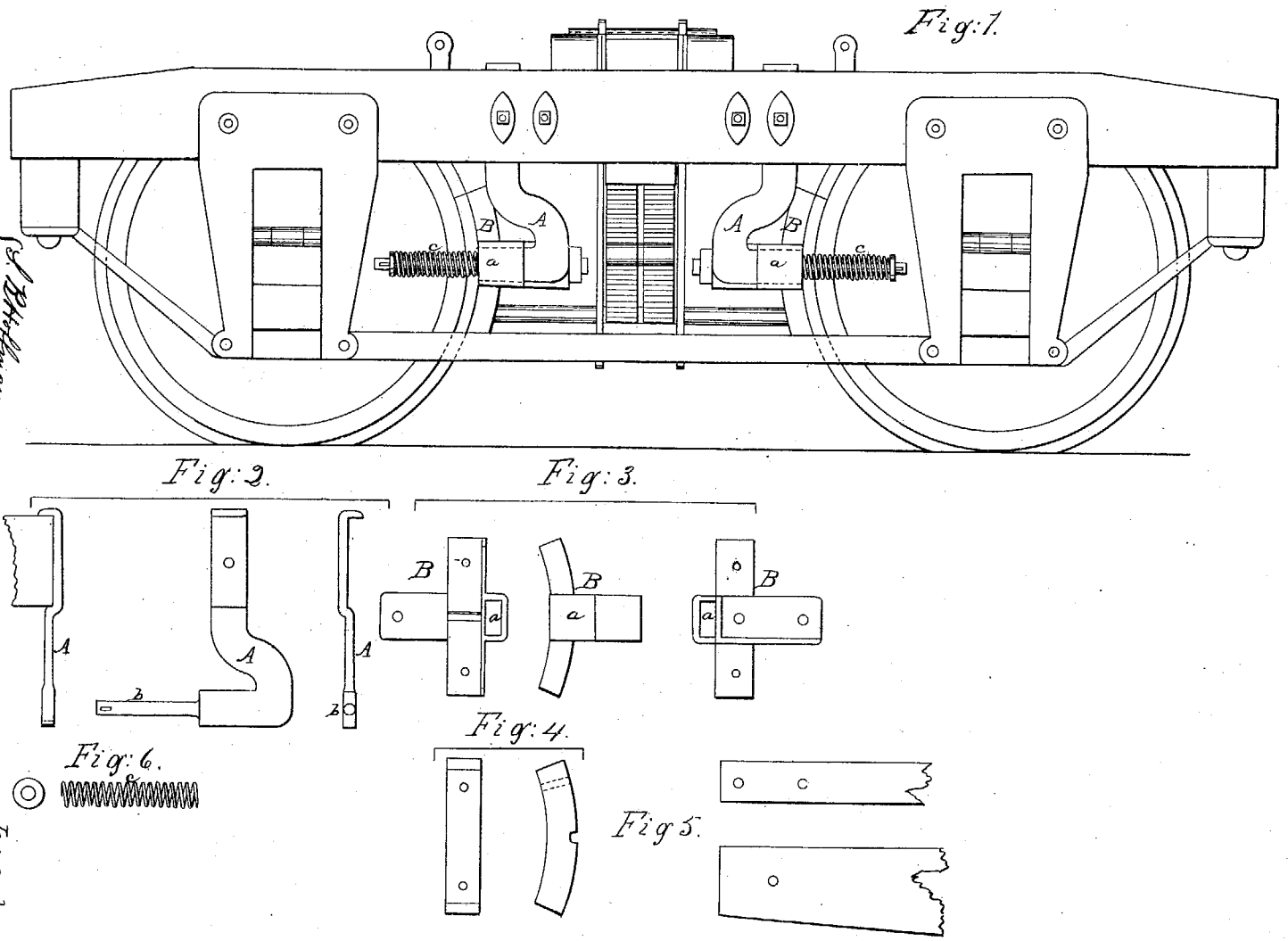
Witnesses
S. B. Hoffman
J. G. Binny Parks.
Inventors
J. W. Latcher & Wm. J. Powell.
N. PETERS, PHOTO-LITHOGRAPHER, WASHINGTON, D. C.

United States Patent Office.

JOHN W. LATCHER AND WILLIAM J. POWELL, OF AMSTERDAM, NEW YORK.

*Letters Patent No.* 45,617, *dated December* 27, 1864; *reissue No.* 2,747, *dated August* 20, 1867.

IMPROVED RAILROAD-CAR BRAKE.

The Schedule referred to in these Letters Patent and making part of the same.

TO ALL WHOM IT MAY CONCERN:

Be it known that we, JOHN W. LATCHER and WILLIAM J. POWELL, of Amsterdam, in the county of Montgomery, in the State of New York, did obtain Letters Patent of the United States for an improvement in Railroad-Car Brakes, which Letters Patent are dated on the twenty-seventh day of December, 1864; and we do hereby declare that the following is a full, clear, and exact description thereof, reference being had to the annexed drawings, making a part of this amended specification, in which—

Figure 1 exhibits a side elevation of a car-truck, showing the manner in which the brake-shoes are sustained in their proper positions by means of the sliding-sleeves and fixed or stationary guide-way.

Figure 2 shows a bracket, which is secured to the truck, and supports the guide-way on which the sleeves slide forward and backward, and one form of which is exhibited in Figure 3, giving three views thereof.

Figure 5 is the cross-beam of the brake.

Similar letters of reference indicate like parts in all the figures.

The object of this invention is to secure greater safety by suspending the brakes on substantial guide-ways secured to the truck, said brakes being provided with sleeves, which are secured to the cross-beams of the brake, and slide the required distance to and from the wheels on said fixed guide-way, and which answer the purpose of preventing the brakes from falling upon the track in case some of its other parts should give out, and also to avoid the unnecessary wear of the brake-shoes attendant upon the use of the link or hanger devices heretofore arranged for the purpose.

This improvement relates to that kind of railroad-car brakes consisting of cross-beams having shoes secured near their ends, and vertical levers attached to and in front of said cross-beams in such a way that when the power is applied on the platform of the car, and conveyed through the medium of said levers and cross-beams, the shoes are pressed against each wheel of the car. These brakes are in quite general use. They are suspended in their action by means of swinging links or hangers, and are jointed at their ends, and held fast to the framework of the truck, and are constructed of various materials and forms. These are objectionable in several particulars:

First. Their tendency is to careen or "tip" the brake-shoes against the wheels, causing them to become worn off at their upper ends by this contact, when it is desirable to have them run free.

Second. Another objection to the use of said links is that there are so many joints, and continually wearing and getting out of order, that they soon let go their hold, and then the cross-beam, with its shoes, falls upon the track, and further destruction is inevitable.

In this our invention we claim a new, useful, and original mode of hanging said brakes, by dispensing with the aforesaid swinging hangers, and substituting in lieu thereof an encircling sleeve, which is secured to the cross-beam, and which slides to and from the wheels on a suitable horizontal guide-way, held or secured rigidly to the car-truck, whereby we secure greater safety, as well as general economy, in their construction and use. This arrangement maintains the rubbing-face of the brake-shoes in a nearly concentric position to the wheels, through the vital agency of the encircling clasps or sleeves which slide on guide-ways. These clasps or sleeves are so constructed that they may be easily detached or applied round or around the guide-way, and permitted to slide thereon, whether said guide-ways be short or long, round or angular; whatever be its shape, so long as it provides a horizontal guide for the said clasp or sleeve to slide over it the required distance, backward and forward, or whether said guide-way performs one or more offices beside. We do not confine ourselves to a particular form or shape for constructing the said sliding-clasps and guide-ways; nor can we particularize the exact points where the said guide-ways shall be secured to the truck, or the precise place on the cross-beam of the brake mechanism where the sliding sleeve shall be secured or attached, as that must be varied according to form of truck, and to the will of the mechanic.

To enable those skilled in the art to fully understand the nature and operation of our invention, we shall proceed to describe it, as follows:

A, fig. 1, represents a bracket-brace or support to a horizontal guide-way, *b*. The bracket or support A is secured centrally between the wheels to the "wheel-piece" or truck-frame. The guide-ways *b* may be formed of one continuous bar, where the trucks will admit of it; that is to say, passing through both sleeves of the brake, and extending each way beyond, and secured to the axle-jaws or other convenient point or part of the truck, and will be better understood by reference to the jaw-brace E, fig. 1, held or secured to the truck. The brake B has a suitable sleeve or mortise, *a*, secured to the cross-beam *d*, and is fitted to slide the required distance on the guide *b*, which dispenses with the use of links or hangers, heretofore used. The sleeves or mortises *a* are secured to the cross-beams *d* by means of bolts, &c., and may be varied to correspond with other mechanical devices of the truck. The brake-shoes are made to recede from the wheels when the pressure is removed, in the usual way, by the use of springs.

We are aware that sliding-brakes, as distinguished from swinging ones, had been in use prior to our invention; but in those the shoes were separated, and were not connected to each other as ours are, by being secured to cross-beams, to the centres of which the actuating-levers are pivoted; they could not, therefore, be operated by the means commonly in use in this country, and were, consequently, wanting in proper stability or firmness, and were liable to tip and bind against the guide-bars and the flanges of the wheels. We do not, therefore, desire to be understood as claiming sliding-brakes broadly, but what we do claim as our invention, and desire to secure by Letters Patent, is—

Suspending or hanging railroad-car brakes by means of suitable sleeves secured to the cross-beams of the brake, and so fitted as to slide forward and backward on appropriate guide-ways secured to the truck, substantially as and for the purposes set forth.

J. W. LATCHER,
W. J. POWELL.

Witnesses:
M. T. KEHOO,
M. W. REID.